United States Patent Office 2,736,705
Patented Feb. 28, 1956

2,736,705

DETERGENT LUBRICATING OILS

Troy L. Cantrell, Drexel Hill, and Herschel G. Smith, Wallingford, Pa., assignors to Gulf Oil Corporation, Pittsburgh, Pa., a corporation of Pennsylvania No Drawing. Application April 5, 1954,
Serial No. 421,186

6 Claims. (Cl. 252—42.7)

This invention relates to mineral oil lubricant compositions containing detergent additives. As is known in the art, detergent additives are incorporated in mineral oil lubricant compositions to suspend or disperse deterioration products or contaminating materials developed during use of the lubricant, as well as to prevent ring sticking and the formation of engine deposits.

In accordance with our invention, we add to a mineral oil lubricant composition a minor amount, sufficient to confer detergency properties, of a product prepared by metathesis of (1) a water soluble salt of an alkaline earth metal and (2) a condensation product of 4 mols of formaldehyde, 4 mols of a monohydric monoalkylated phenol having at least 4 carbon atoms in the alkyl group, 2 mols of an alkali metal hydroxide, 2 mols of carbon disulfide, and 1 mol of an alkaline earth metal hydroxide. The additives of our invention act as bearing corrosion and rust inhibitors in addition to conferring detergency properties. They are oil-soluble materials containing in a unitary condensation product alkaline earth metal and sulfur.

The additives are prepared by first forming a condensation product of the phenol, formaldehyde, alkali metal hydroxide, carbon disulfide and alkaline earth metal hydroxide in the proportions stated, and then subjecting the condensation product to metathesis with a water-soluble salt of an alkaline earth metal, e. g., the calcium, barium, magnesium or strontium nitrates or chlorides. Although in preparing the additives the reactions proceed spontaneously at room temperature, it is preferred to employ moderately elevated temperatures, particularly in the last stages of the reaction. As a final step after the metathesis reaction, the temperature is raised to dehydrate the product, i. e., to distill off the water formed in the reaction and added with the reactants. A dehydration temperature of about 280° F. is suitable. It is advantageous to employ a naphtha or mineral lubricating oil as a reaction medium in order to obtain the final product in the form of a concentrated solution suitable for blending with various mineral oils.

The monohydric monoalkylated phenols employed as a reactant have at least four carbon atoms in the alkyl group. For example, such straight and branched chain alkyl groups as butyl, amyl, heptyl, octyl, nonyl, decyl, stearyl, cetyl and the long chain groups derived from paraffin wax are suitable. The alkyl group containing from four to twelve carbon atoms from a preferred class. A preferred phenol is tetramethylbutyl phenol obtained by the alkylation of phenol with diisobutylene in known manner.

The formaldehyde employed in the condensation reaction is most conveniently used in the form of commercial aqueous formalin, containing 37 per cent by weight of formaldehyde. In performing the condensation reaction, it is convenient to disperse or dissolve the alkaline earth metal hydroxide either in water or in the aqueous formaldehyde solution. The alkali metal hydroxide and the alkaline earth metal salt are also employed in aqueous solution.

The following example is illustrative of the preparation of one of the additives of this invention. Unless otherwise stated, all parts are by weight.

*Example I.*—Into a reaction vessel, there were charged 824 parts of tetramethylbutyl phenol and 82 parts of a 40 per cent solution of sodium hydroxide. The mixture was heated with stirring to 180° F. for one hour, cooled to 120° F., and then 500 parts of water and 80 parts of carbon disulfide were added. This was then heated to 200° F. with stirring for two hours. Into a separate reaction vessel, there were charged 74 parts of calcium hydroxide, 150 parts of water and 327 parts of formalin. This mixture was agitated at 160° F. for one hour and was then added to the first reaction vessel. The temperature of the combined mass was slowly raised to 220° F. As agitation was continued at that temperature, 110 parts of calcium chloride in 100 parts of water was added for the metathesis reaction. Thereafter, the temperature was gradually raised to 280° F. until all water was distilled off and the product was dehydrated. The solution obtained was then filtered. The mineral oil solution of the product had the following properties:

| | |
|---|---|
| Gravity: ° API | 20.6. |
| Viscosity, SUS: 210° F. | 89.9. |
| Color, ASTM Union | 7.5. |
| Sulfur, B: per cent | 0.53. |
| Neutralization No. | 19.32 alkaline. |
| Ash as Sulfate: per cent | 5.17. |

The metal and sulfur containing condensation products of our invention are excellent addition agents. They are readily soluble in all types of mineral lubricating oils and can be blended with them in high proportions. They confer excellent detergent effects and rust inhibiting properties on the mineral lubricating oils in which they are incorporated, and are good bearing corrosion inhibitors. For these purposes the condensation products are added to mineral oil lubricants in minor amounts, from about 0.1 to about 25 per cent by weight, sufficient to confer improved detergency properties. Generally, the addition of about 1 to 2 per cent by weight of the condensation products is sufficient to effect the desired improvement, but for heavy duty applications larger amounts are employed.

In order to illustrate the use of the condensation products of this invention in lubricating oils, an aviation lubricating oil was blended with 6 per cent by volume of the condensation product prepared according to Example I. Comparative inspections and tests of the identical untreated oil and the treated oil are as follows:

| | Untreated Oil | Treated Oil |
|---|---|---|
| Gravity, ° API | 26.1 | 25.8. |
| Viscosity, SUS: | | |
| 100° F | 1,671 | 1,602. |
| 210° F | 118.9 | 115.4. |
| Viscosity Index | 96 | 96. |
| Flash, OC, ° F | 550 | 565. |
| Fire, OC, ° F | 620 | 630. |
| Pour, ° F | 0 | 0. |
| Aging Test, 32° F., 24 Hrs | bright | bright. |
| Room Temp., 15 Days | do | Do. |
| Color, ASTM Union | 5.0 | 7.0. |
| Appearance | bright | bright. |
| Copper Strip Test, 212° F., 3 Hrs | passes | passes. |
| Corrosion Test, ASTM D 665-46 T: | | |
| Distilled Water— | | |
| Steel Rod, Appearance | rust | bright. |
| Area Rusted, Percent | 100 | 0. |
| Engine Rating, CRC L-4: | | |
| Engine Condition Rating | failed to complete. | 93. |
| Bearing Loss, Mg./Whole Bearing | do | 57. |

As shown above, the condensation products of this invention confer effective detergency and bearing corrosion inhibiting properties. This is shown under the CRC L-4 test. The improvement in rust inhibiting properties is shown under the Corrosion Test.

While a mineral lubricating oil composition has been shown in the above example, the invention is not to be limited thereto but comprises all mineral oil lubricants to which the condensation products of this invention are added, such as greases and the like. As is shown in the art, other additives in addition to the condensation products of our invention can also be employed. Such additives include pour point depressants, viscosity index improvers, antifoam agents, coloring agents, thickeners and the like.

We claim:

1. A lubricant composition comprising a major amount of a mineral lubricating oil and a minor amount, sufficient to confer detergency properties on the composition, of a product prepared by dehydrating the product of metathesis of: (1) a condensation product prepared by the process which comprises reacting a mixture of about 4 mols of a monohydric monoalkylated phenol and about 2 mols of an alkali metal hydroxide in aqueous solution, cooling the resulting mixture, adding thereto about 2 mols of carbon disulfide and additional water, heating to about 200° F., then adding thereto a mixture of about 1 mol of an alkaline earth metal hydroxide in an aqueous slurry and about 4 mols of formaldehyde and reacting the resulting mixture; with (2) an aqueous solution of a water-insoluble salt of an alkaline earth metal.

2. The composition of claim 1, wherein the monoalkylated phenol contains from 4 to 12 carbon atoms in the alkyl group.

3. The composition of claim 1, wherein the monoalkylated phenol is tetramethylbutyl phenol.

4. The composition of claim 1, wherein the product is present in an amount of from about 0.1 to 25 per cent by weight.

5. The composition of claim 1, wherein the alkaline earth metal is calcium, and the alkali metal is sodium.

6. A lubricant composition comprising a major amount of a mineral lubricating oil and a minor amount, sufficient to confer detergency properties on the composition, of a product prepared by dehydrating the product of metathesis of: (1) a condensation product prepared by the process which comprises heating to about 180° F. a mixture of about 824 parts of tetramethylbutyl phenol and about 33 parts of sodium hydroxide in aqueous solution, cooling the resulting mixture, adding thereto about 80 parts of carbon disulfide and about 500 parts of water, heating to about 200° F., then adding a mixture of about 74 parts of calcium hydroxide in an aqueous slurry and about 327 parts of formalin and heating to about 220° F.; with (2) about 110 parts of calcium chloride in aqueous solution.

References Cited in the file of this patent

UNITED STATES PATENTS

| | | |
|---|---|---|
| 2,497,099 | Smith et al. | Feb. 14, 1950 |
| 2,545,113 | Smith et al. | Mar. 13, 1951 |